United States Patent
Moore

(10) Patent No.: US 11,734,372 B2
(45) Date of Patent: Aug. 22, 2023

(54) ENHANCING MAP DATA BASED ON POINTS OF INTEREST

(71) Applicant: Uber Technologies, Inc., San Francisco, CA (US)

(72) Inventor: Christopher Moore, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 54 days.

(21) Appl. No.: 17/216,490

(22) Filed: Mar. 29, 2021

(65) Prior Publication Data

US 2021/0216605 A1 Jul. 15, 2021

Related U.S. Application Data

(63) Continuation of application No. 16/236,155, filed on Dec. 28, 2018, now Pat. No. 10,990,640.

(Continued)

(51) Int. Cl.

| | |
|---|---|
| *G06F 16/00* | (2019.01) |
| *G06F 16/9538* | (2019.01) |
| *G01C 21/36* | (2006.01) |
| *G06Q 50/30* | (2012.01) |
| *G06F 9/451* | (2018.01) |
| *G06F 16/9535* | (2019.01) |

(Continued)

(52) U.S. Cl.
CPC ..... *G06F 16/9538* (2019.01); *G01C 21/3667* (2013.01); *G06F 9/451* (2018.02);
(Continued)

(58) Field of Classification Search
CPC .......... G06F 16/24578; G06F 16/9537; G06F 16/29; G06F 16/9535; G06F 16/9538;
(Continued)

(56) References Cited

U.S. PATENT DOCUMENTS

| | | | |
|---|---|---|---|
| 5,604,676 A | * | 2/1997 | Penzias .............. G06Q 30/0284 705/417 |
| 9,256,795 B1 | | 2/2016 | Gray et al. |

(Continued)

FOREIGN PATENT DOCUMENTS

EP      1873491 A1    1/2008

OTHER PUBLICATIONS

International Search Report and Written Opinion received for PCT Patent Application No. PCT/IB2018/060713, dated May 8, 2019, 12 pages.

(Continued)

*Primary Examiner* — Vincent F Boccio
(74) *Attorney, Agent, or Firm* — Fenwick & West LLP

(57) ABSTRACT

An online system receives a trip request including a location of the user requesting the trip. The online system identifies buildings or geographies based on the received location and determines location boundaries associated with the identified buildings or geographies. The online system identifies a set of hotspots representing locations that are frequently used for pickup or drop off. The online system additionally identifies a set of points of interest. The points of interest are, for example, businesses, landmarks, building names, or other visible information related to the location. The online system scores the set of points of interest based on a relative value of displaying the point of interest for orientation or navigation purposes. The online system modifies a user interface to display a map of the area including the identified location boundaries, hotspots, and one or more points of interest based on the scoring.

20 Claims, 12 Drawing Sheets

Related U.S. Application Data

(60) Provisional application No. 62/612,628, filed on Dec. 31, 2017.

(51) Int. Cl.
    *G06F 16/9537*     (2019.01)
    *G06F 16/2457*     (2019.01)
    *G06F 16/29*     (2019.01)
    *G06F 3/04845*     (2022.01)

(52) U.S. Cl.
    CPC ........ *G06F 16/24578* (2019.01); *G06F 16/29* (2019.01); *G06F 16/9535* (2019.01); *G06F 16/9537* (2019.01); *G06Q 50/30* (2013.01); *G06F 3/04845* (2013.01)

(58) Field of Classification Search
    CPC . G06F 9/451; G06F 3/04845; G01C 21/3438; G01C 21/3682; G01C 21/3614; G01C 21/3667; G06Q 50/30; G06Q 30/02
    USPC .......................................................... 707/724
    See application file for complete search history.

(56) References Cited

U.S. PATENT DOCUMENTS

| | | | |
|---|---|---|---|
| 9,304,009 | B2 | 4/2016 | Beaurepaire et al. |
| 9,684,846 | B2 | 6/2017 | Bostick et al. |
| 9,769,616 | B1 | 9/2017 | Pao et al. |
| 9,894,484 | B1* | 2/2018 | Pao ........................ H04W 4/029 |
| 2003/0229446 | A1* | 12/2003 | Boscamp ............... G01C 21/26 342/357.44 |
| 2006/0129313 | A1* | 6/2006 | Becker ............. G08G 1/096844 340/995.19 |
| 2007/0233385 | A1* | 10/2007 | Dicke ..................... H04L 67/34 707/E17.11 |
| 2008/0027770 | A1 | 1/2008 | Tigali et al. |
| 2009/0055087 | A1 | 2/2009 | Beacher |
| 2011/0015958 | A1 | 1/2011 | April et al. |
| 2014/0074395 | A1 | 3/2014 | Brown |
| 2015/0117796 | A1 | 4/2015 | Hile et al. |
| 2016/0370194 | A1 | 12/2016 | Colijn et al. |
| 2017/0103278 | A1 | 4/2017 | Bostick et al. |
| 2017/0193404 | A1 | 7/2017 | Yoo et al. |
| 2017/0314954 | A1 | 11/2017 | Golding et al. |
| 2017/0350719 | A1 | 12/2017 | Moore et al. |

OTHER PUBLICATIONS

United States First Action Interview Office Action, U.S. Appl. No. 16/236,155, dated Nov. 3, 2020, four pages.

United States Pre-Interview Communication, U.S. Appl. No. 16/236,155, dated Jul. 30, 2020, four pages.

European Patent Office, Extended European Search Report and Opinion, EP Patent Application No. 18897640.1, dated Sep. 28, 2021, ten pages.

* cited by examiner

PINNING: Move the map to another building

DROP THE PIN

ENHANCING MAP DATA BASED ON POINTS OF INTEREST

CROSS-REFERENCE TO RELATED APPLICATIONS

This application is a continuation of U.S. patent application Ser. No. 16/236,155, filed Dec. 28, 2018, which claims the benefit of U.S. Provisional Application 62/612,628, filed Dec. 31, 2017, all of which are incorporated by reference in their entirety.

BACKGROUND

This invention relates generally to visualizing mapping data, and more particularly to improving a user interface for navigating users.

Designating real-life geography for a user on a display may be a challenge, particularly when an automated system attempts to coordinate a rendezvous at a common location for more than one user while minimizing the time it takes for the users to identify the rendezvous. In particular, the system designates a meeting location, for example for a travel service, that may lack effective landmarks and which may be difficult for users to determine what real-life location corresponds to the meeting location. Accordingly, there is a need for user interfaces to more effectively communicate information about such locations to users and improve user understanding of such maps.

SUMMARY

To improve the display of location information, an online system may designate street-level information for a location and include points of interest near the location to improve understanding of users navigating to the location. For example, an online system may provide a travel coordination service between a rider and a provider. When the rider initiates a trip request, the online system may identify geographic information near the rider and customize a map for the user to select a pickup location. The pickup location, when displayed to the rider and the provider, may include points of interest and highlight a curb or side of the road of the pickup location, rather than just designating a part of a road.

When the online system receives a trip request, the trip request includes a location of the user requesting the trip. Online system identifies a location of the user and identifies any buildings or other geography in which the user is located. To customize a display for the user, the online system identifies a boundary associated with the building or geography, along with any exits or other exit points from the building. In addition, the online system identifies a set of "hotspots" associated with the location or within a threshold of the location. In addition, to assist the user in navigating, the online system identifies and scores a set of points of interest near the user's location. The points of interest may be businesses, landmarks, building names, or other visible reference points at the user's location. The points of interest are scored to determine a relative value of displaying each point of interest, particularly with respect to the point of interest's ability to assist in orienting or navigating a user's view of the area when viewing a map of the area provided by the online system. The scoring may account for the relative visibility of the point of interest, as well as the frequency of trips associated with the point of interest, which may vary over time, such as a day or week, and permit the most-relevant points of interest to score well and be displayed to a user. Based on the data available for the region and scoring of the points of interest, the online system modifies the map display to display the location boundary, a set of point of interests, and suggested hotspots for the location. When a rider or provider moves the displayed map, the process may be repeated to re-evaluate points of interest and hotspots relevant to the moved map display.

When the user selects a meeting location, the online system may then provide a similar display to the user requesting the trip and any provider agreeing to service the trip to improve coordination between the rider and provider.

Accordingly, a more intuitive meeting location is selected and coordinated between the rider and provider, which permits relevant buildings, points of interests, and meeting locations to be selected and displayed. The meeting locations may also disambiguate between sides of a street and assist the users in determining more precisely where to meet. In addition, the system may automatically adjust the mapping modification and enhancement according to the map data known in a particular area. Although examples described herein refer to a user as a rider that makes a request for a location-based service, such as a transport service, in other examples, the user can make a request for a delivery service so that a driver can transport a good or an item from one location (e.g., a pickup location of the item) to another (e.g., a drop off location of the item).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
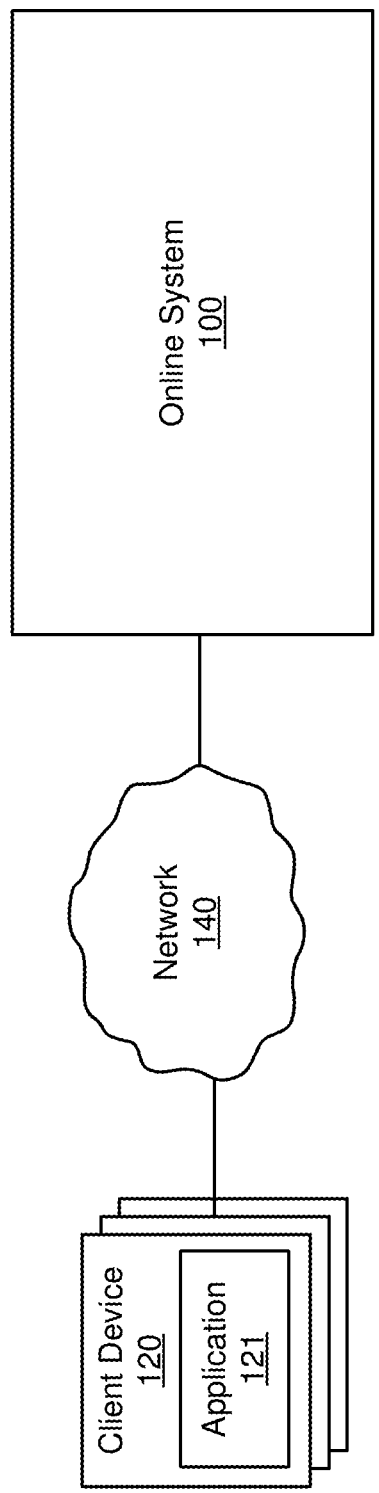
FIG. 1 is a block diagram of a system environment in which an online system operates, in accordance with an embodiment.

FIG. 1 illustrates a detailed view of an environment in which users use their client devices 120 to communicate with an online system 100, such as to request transportation services, according to one embodiment. For example, the online system 100 can provide a network service to enable users to request location-based services using their respective designated client applications. The online system 100 can process the requests to identify service providers to provide the requested services for the users. Still further, the online system 100 receives data—such as user trip pickup or destination data, or user location query data—based on which the server enhances a user interface for improving identification of a meeting location for a trip. Although described in relation to a "trip," the interface improvements described herein may be used for any display of a location on a map to assist users in identifying a physical location corresponding to the location displayed on a map provided by the online system 100. One possible example of the environment depicted in FIG. 1 is a network in which users use their client devices 120 to communicate and arrange transportation services.

The client device 120 can correspond to a computing device, such as a smart phone, tablet computer, laptop, or any other device that can communicate over the network 140 with the online system 100. In the embodiment illustrated in FIG. 1, the client devices 120 include an application 121 that the users of the client devices use to interact with the server 100, e.g., to provide location data and queries to the server 100, to receive map-related data and/or directions from the server, and the like. In one embodiment, the application 121 is created and made available by the same organization responsible for the server 100. Alternatively, in another example, the application 121 can be a third-party application that includes features (e.g., an application programming interface or software development kit) that enables communications with the server 100. Although for simplicity only one server 100 and several client devices 120 are illustrated in the environment FIG. 1, it is appreciated that there may be any number of both client devices 120 and servers 100 within the environment.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The online system 100 receives requests from client devices 120 operated by various users and provides mapping and other services to users of the client devices 120. As described herein, the online system 100 provides mapping and navigation to users of the client devices 120, and may provide additional features and services. The online system 100 may also coordinate travel services comprising a "trip" provided by a user operating a vehicle, termed a provider, and a user wishing to travel to a destination, termed a rider. The online system 100 provides travel coordination services by matching riders and providers and by assisting riders and providers to jointly identify a meeting location (e.g., at which a rider may enter a provider's vehicle) and a destination (e.g., at which a rider may exit the provider's vehicle). In other examples, the provider may transport other objects or goods, such as groceries, packages, and the like, rather than the requesting user. E.g., the requesting user may not actually enter the vehicle, but may use the online system 100 to coordinate a meeting place and destination for other objects to enter the provider's vehicle. Thus, the online system 100 facilitates the transportation of one user (hereinafter referred to as the rider) —or of objects, such as groceries, packages, or the like—by a second user (hereinafter referred to as the provider) from a first location (hereinafter referred to as the meeting location) to a second location (hereinafter referred to as the destination location, or simply the destination), such as by providing map and/or navigation instructions to the respective client applications of the rider and the driver. In one example, the online system 100 can include a matching service (not illustrated in FIG. 1 for purposes of simplicity) that facilitates a rider requesting a trip from a pickup location to a destination location, and further facilities a driver agreeing to provide the trip to the rider. For example, the matching service interacts with the applications 121 of the rider and a selected driver, establishes a trip for the rider to be transported from the pickup location and the destination location, and handles payment to be made by the rider to the driver. Additionally, in one embodiment, the online system 100 interacts with at least the application 121 of the driver during the trip, obtaining trip location information from the application (e.g., via Global Positioning System (GPS) or other geolocation coordinates) and providing navigation directions to the application that aid the driver in traveling from the driver's current location to the specified destination of the trip. The online system may also facilitate a driver navigating to or obtaining information about a particular location, regardless of whether the driver has a rider, such as permitting the driver to navigate to a particular gas station, or to the pickup location of a rider.

To aid in permitting the rider and provider to meet in a jointly desirable location for providing the trip, the online system 100 retrieves information about the areas in which the online system 100 provides mapping information and modifies the user interface display of mapping data to assist users in correctly navigating the area and in identifying locations in the around the mapped area.

Figure 2:
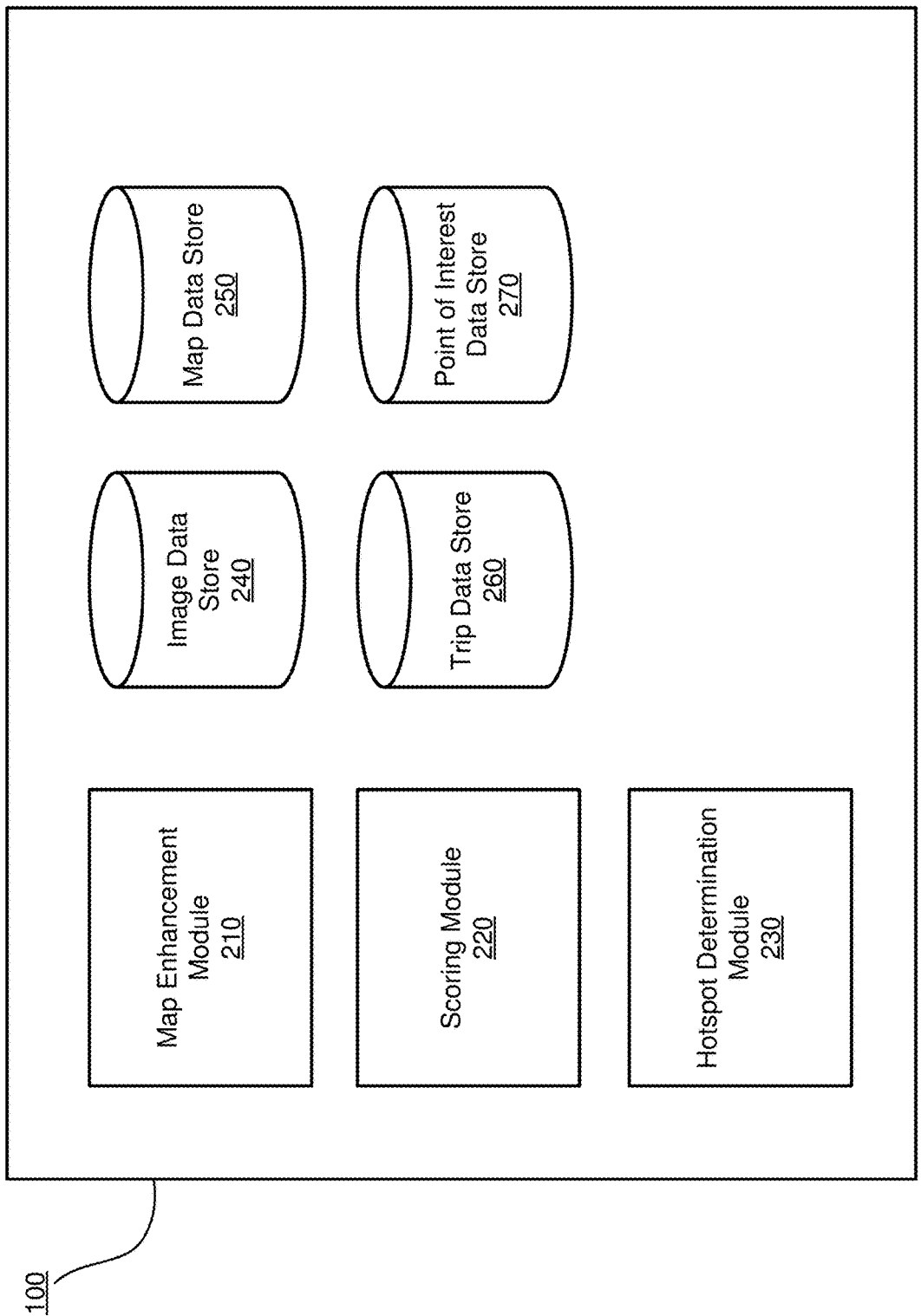
FIG. 2 is a block diagram of an architecture of the online system, in accordance with an embodiment.

FIG. 2 illustrates components of the online system 100 according to one embodiment. In this example, the online system 100 includes a map enhancement module 210, a scoring module 220, a hotspot determination module 230, an image data store 240, a map data store 250, a trip data store 260, and a point of interest data store 270. In implementation, the online system 100 may include additional modules and features as not illustrated or discussed in detail herein, including modules and systems for providing matching among providers and riders and routing providers to destinations. Various example user interfaces as provided by the online system 100 are shown in FIGS. 3A-3I.

The online system 100 includes various data stores for providing improved mapping services and enhancement to users. The map data store 250 includes various types of data that online system 100 uses to provide mapping and navigation services and otherwise facilitate transportation. More specifically, the map data store may include information used to calculate routes, to render graphical maps, and the like. For example, the maps data include elements such as intersections and the roads connecting them, bridges, off-ramps, buildings, and the like, along with their associated locations (e.g., as geo-coordinates). The map data may include association with points of interest as further discussed with point of interest data store 270, relating to points of interest, such as landmarks, businesses, and entities associated with different portions of a map.

The map data store 250 may further include prior searches that various users have conducted in the past. The searches may be, for example, a search for a particular point of interest (e.g., "Contemporary Jewish Museum"), or a rider request for a trip designating an address (e.g., from the pickup location designated by the address "1455 Market Street, San Francisco" to the destination location designated by the landmark name "Contemporary Jewish Museum").

In some embodiments, the online system includes image data store 240, which associates images captured from along routes (e.g., the streets being driven) with positions and directions from which they were captured. For example, the image data store 140 might indicate that individual images are associated with a particular geo-coordinate with a particular orientation angle. The image data store 240 may additionally include metadata derived from processing the street image data, such as text derived from optical character recognition (OCR) of text within the images (e.g., street names, shop names), or indications of point of interest identity (e.g., the Contemporary Jewish Museum) as determined by image analysis, thereby indicating that a particular point of interest is visible from the street.

The trip data store 260 may include data related to prior trips coordinated by the online system, including, for example, pickup and destination locations for trips coordinated by the online system 100. The trip data store 260 may include additional information describing prior trips, such as timestamps associated with pickup and drop off during the prior trips.

The point of interest data store 270 may include information related to various points of interest, such as businesses, landmarks, and other information related to different geographical areas. The points of interest may also be correlated with particular locations in the map data store 250, such as a geographical location or geofence, or with a particular building of the map data store 250. Thus the points of interest may reflect areas viewable by a person near portions of a location. The image data store 240 may be analyzed to identify text and other associations of images captured in a map with the points of interest in the point of interest data store 170. For example, the image data store 240 may include images of a side of a building from the street. The point of interest data store 270 may include multiple points of interest associated with that building. When analyzing the image, the text may be analyzed for the side of the building to identify one or more of those points of interest represented by the image, for example as having words in common with text on the side of the building. The images may also designate a time associated with the image. In these cases, the visibility of a point of interest may also be affected by the time of day.

The map enhancement module 210 receives a request for a map of a location and enhances the map of the location based on various characteristics of the area in the map and the requesting user. When providing a travel coordination service, for example, the online system 100 may receive a request for transport for a rider, who may designate a destination and a location to meet the provider for the travel service. The request from the rider may include location information of the rider. The map enhancement module 210 identifies the location associated with the rider and coordinates map enhancements to customize the map for the user's request. In particular, the map enhancement module 210 may use available data to add point of interest, hotspot, and pickup curb designations to the interface shown to the user when providing the map to the user.

To provide this data, the map enhancement module 210 may identify a building associated with a user's location, as well as any exit and entry points to the user's location. In addition, the map enhancement module 210 may identify points of interest within a threshold distance from the user location and provide the points of interest to the scoring module 220 to score. After scoring, the map enhancement module 210 may identify a number of points of interest (e.g., up to a maximum number, or above a minimum threshold score) to provide on the map. Examples are shown in FIGS. 3A-3I. In addition, the map enhancement module may provide the location and building to hotspot determination module 230 to identify hotspots relevant to the location of the user or to the building.

The scoring module 220 scores the points of interest to determine their relevance and prominence with respect to the ability of the point of interest to navigate a user. The scoring may be performed based on the particular user, and may for example use a user's prior trips and familiarity with an area to increase the score for a point of interest that the user has previously had a trip to. In addition, the scoring module 220 may use point of interest data from the point of interest data store 270 to determine the ability of a point of interest to assist in orienting or navigating a user's view of the area, such as the relative visibility of the point of interest at the time of the current request. For example, those points of interest which are particularly visible at the time of the request may score more highly relative to other points of interest that are not relatively visible. The visibility of a point of interest may be determined by analyzing an image associated with the location to determine text or other content in the image from the image data store 240 and determine whether the text matches terms associated with the point of interest.

In addition, the scoring for the point of interests may include whether trips begin or end at the point of interest at that time. For example, a point of interest such as a library may be active or busy during the day, while a nightclub may be active or busy in the evening and early morning. Accordingly, these points of interest are assigned higher scores during the times when they are more likely to receive trips, such that the points of interest which score well may reflect the current activity in an area, and do not highlight those points of interest which are unlikely to be of interest.

The hotspot determination module 230 identifies "hotspots" for travel in relation to a particular area. For example, a hotspot represents a cluster of locations in which trips commonly begin or end. These hotspots may be a clustering of the meeting location or the destination for a trip, and thus represent convenient locations for beginning a trip. These hotspots may be provided to the map enhancement module 210 to determine the location for pickup or drop off.

FIGS. 3A-3I illustrate example user interfaces for enhancing a map display for a user.

Figure 3A:
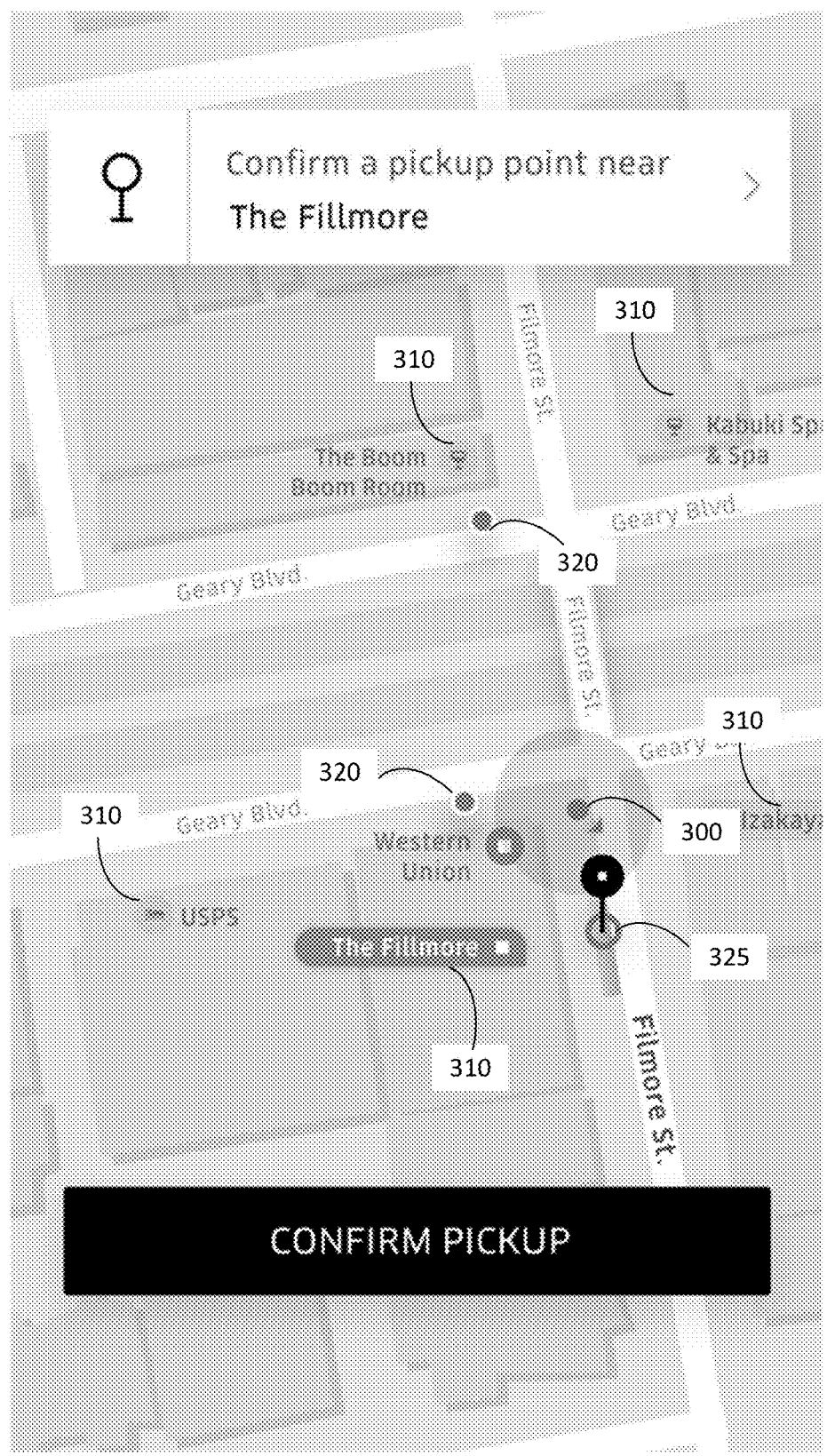
FIGS. 3A-3I illustrate example user interfaces for enhancing a map display for a user, in accordance with an embodiment.

FIG. 3A shows an interface for a user to select a pickup location. In this example, a user's location 300 is designated with a range of uncertainty about the user's location. After the user's location is determined, as discussed above the points of interest 310 may be identified and scored, and displayed on the map. In this example, several points of interest, such as "The Fillmore" or "USPS" are shown, while other points of interest in other buildings, which did not score highly, are not shown. In addition, multiple hotspots 320 are shown, designating locations at which users are commonly picked up. In this example, a user has selected a meeting/pickup location 325. The map enhancement module 210 may also identify a curb or side of the street as shown for the meeting location 325 to designate to the rider which side of the street to use for the pickup. Likewise, the meeting location 325 when shown to the provider may also highlight a side of the street.

To determine a side of the street, the user may indicate on the map which side of the street is desired. In other examples, when the hotspot is automatically generated, the hotspot may be associated with a side of the street based on the location coordinates of the trips which have been grouped to identify the hotspot. For example, the coordinates may have a centroid on one side of the street rather than the other. In another example, the side of the street for a hotspot may be inferred based on the prior approach to the hotspot by a rider along a street, or by the direction of travel of a provider while picking up a rider at a hotspot. By automatically associating and displaying a side of the street and permitting highlight of a curb associated with the pickup, the display may more effectively show to the rider and provider where to meet for the service.

Figure 3B:
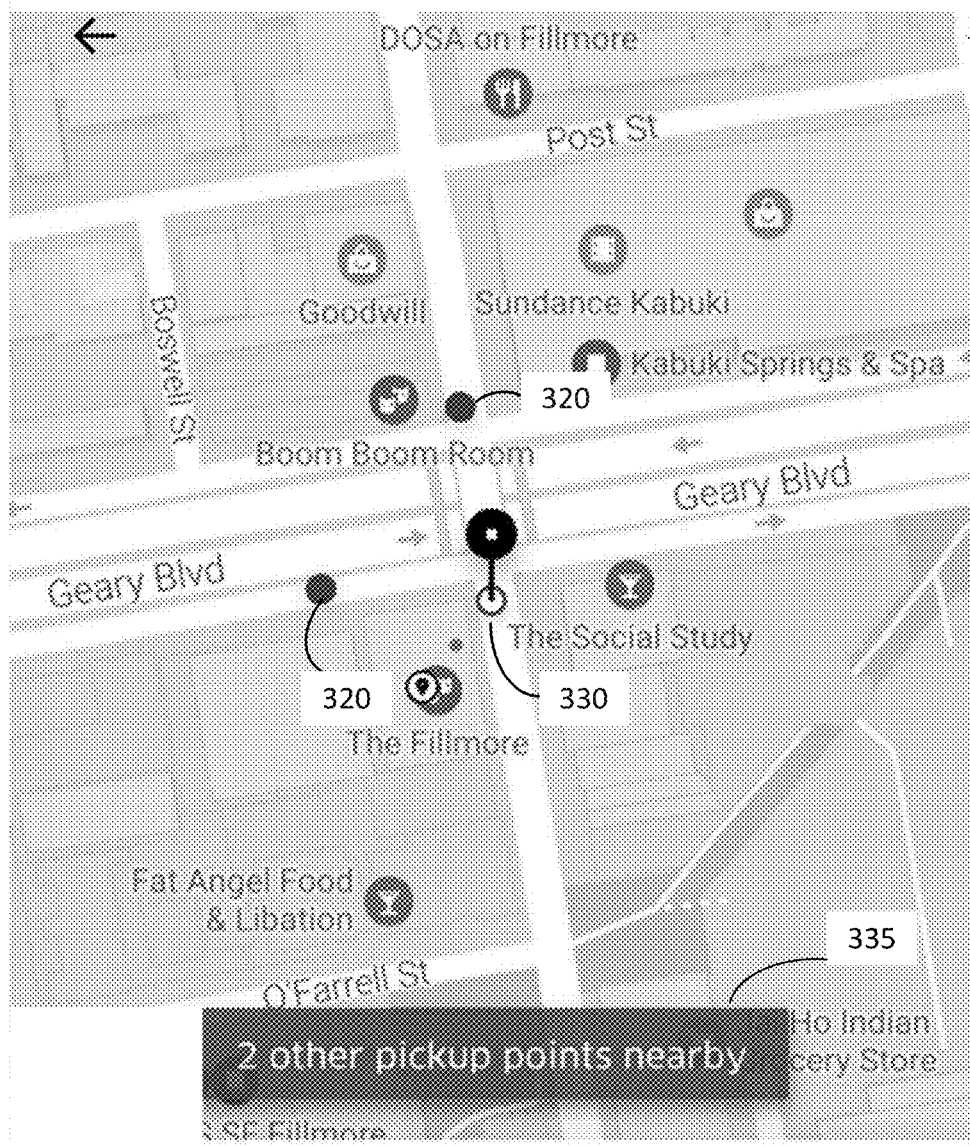

FIG. 3B illustrates an additional example in which the rider may be notified that there are additional hotspots or "pickup spots" near the user's selected location. In the example of FIG. 3B, responsive to a user selecting a pickup spot 330, the user is notified via a text box 335 that additional hotspots or "pickup points" are nearby ("2 other pickup points nearby"). In one embodiment, the additional hotspots 320 are shown. Users may select the additional hotspots 320 to adjust the pickup spot 330. In one embodiment, the user is additionally prompted to confirm the pickup 340 at the selected location.

Figure 3C:
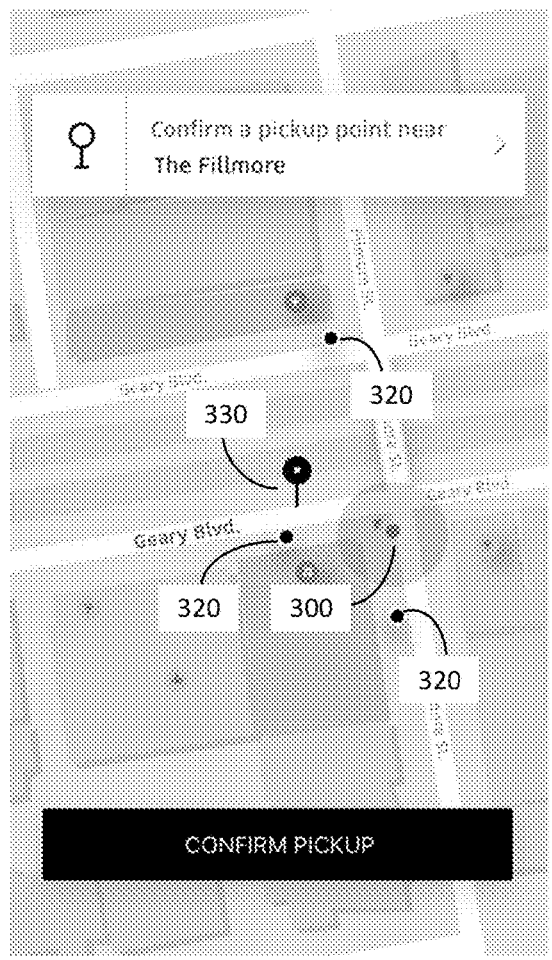
Figure 3D:
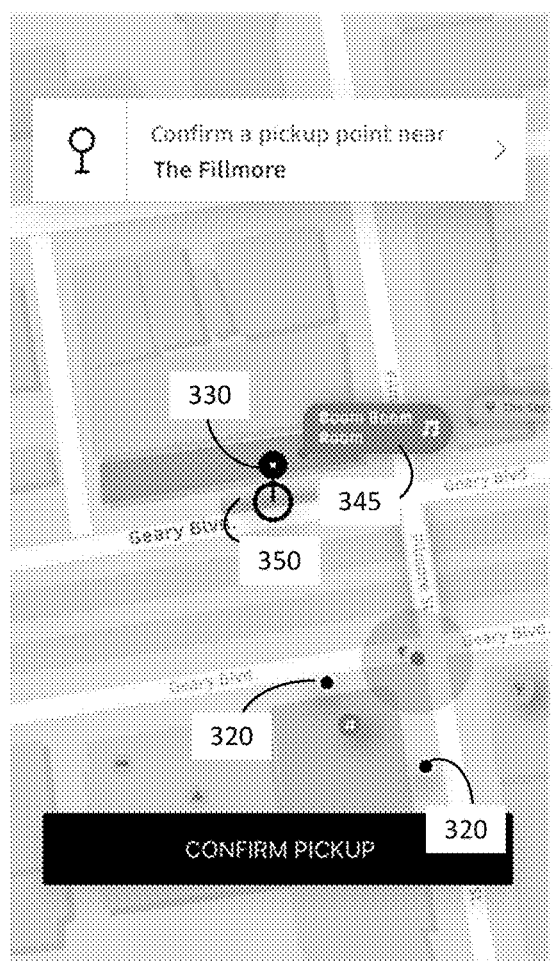

FIGS. 3C-3D illustrate an additional example prompting the user to move the map to another location or building and displaying additional hotspots shown in relation to that location or building. As shown in FIG. 3C, the user's selection of a pickup location may be based on a selected building and hotspots associated with that building. As discussed in conjunction with FIG. 3A, multiple hotspots 320 are identified based on a user's location 300 and a building associated with that location. In the case that another building or location is more desirable for pickup (e.g., the user intends to move in the direction of the other building or location), the user may select and move a pin 330 to indicate a location other than the current user location 300.

In FIG. 3D, additional hotspots are identified based on a building or location selected by the user. Responsive to the user dropping the pin 330 to indicate another building or location, the map enhancement module 210 identifies a point of interest 345 associated with the selected building or location and modifies the user interface to display the point of interest and an additional hotspot 350 associated with the point of interest. Previously identified hotspots 320 may still be shown in association with the selected building or location.

Figure 3E:
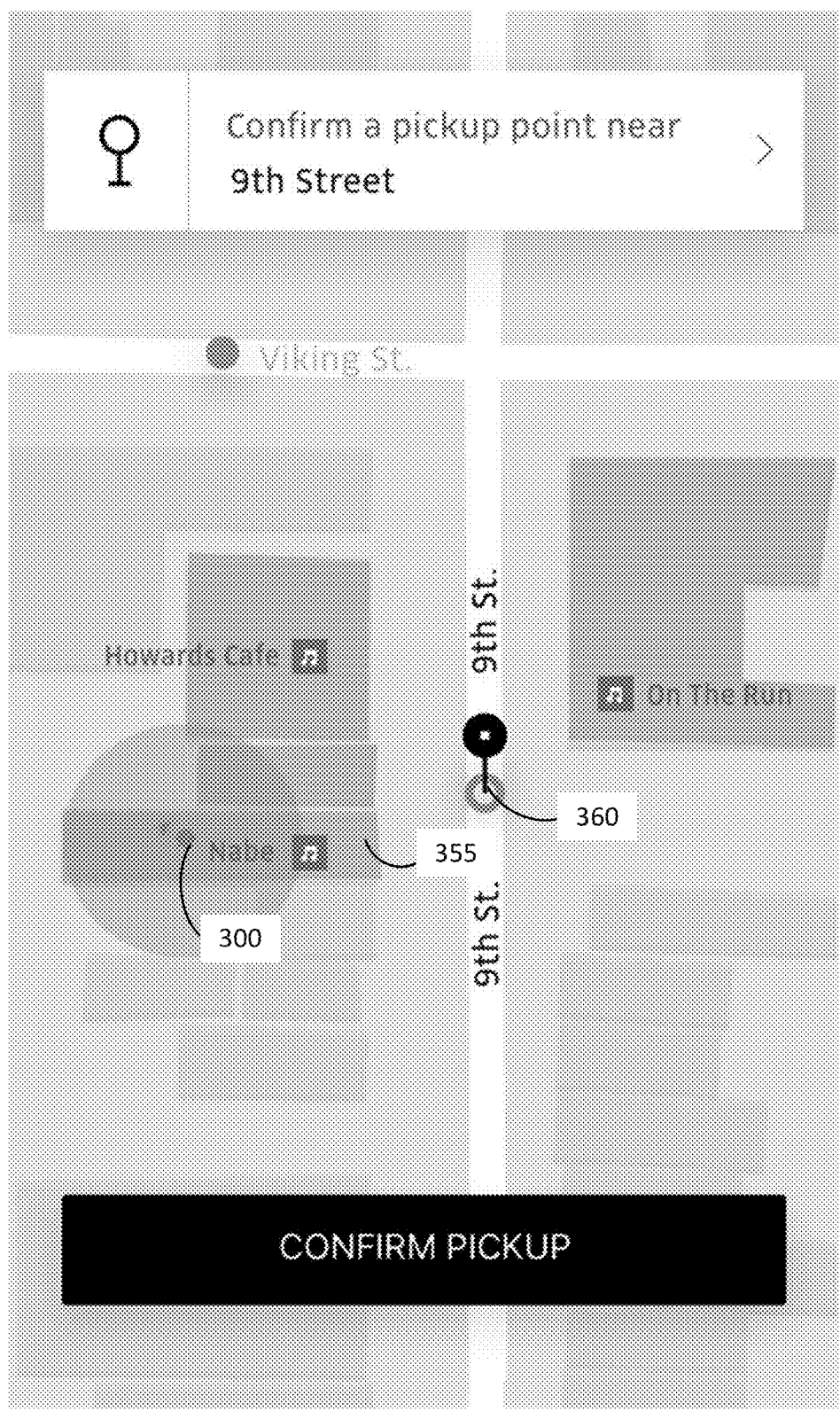

FIG. 3E illustrates an example in which the user is associated with a location 300 inside a building 355. In this example, the geographical footprint of the building 355 may be highlighted, along with possible entrances and exits to the building. In this example, the user has selected a hotspot 360, which is not associated with a side of the street. Therefore, when the user selects the hotspot, rather than designating a curb or side of street, the user interface may more generally designate the location, for example in the middle of the street. As another alternative, the user interface may provide the user an option to select a side of the street when no side is automatically associated with the hotspot.

Figure 3F:
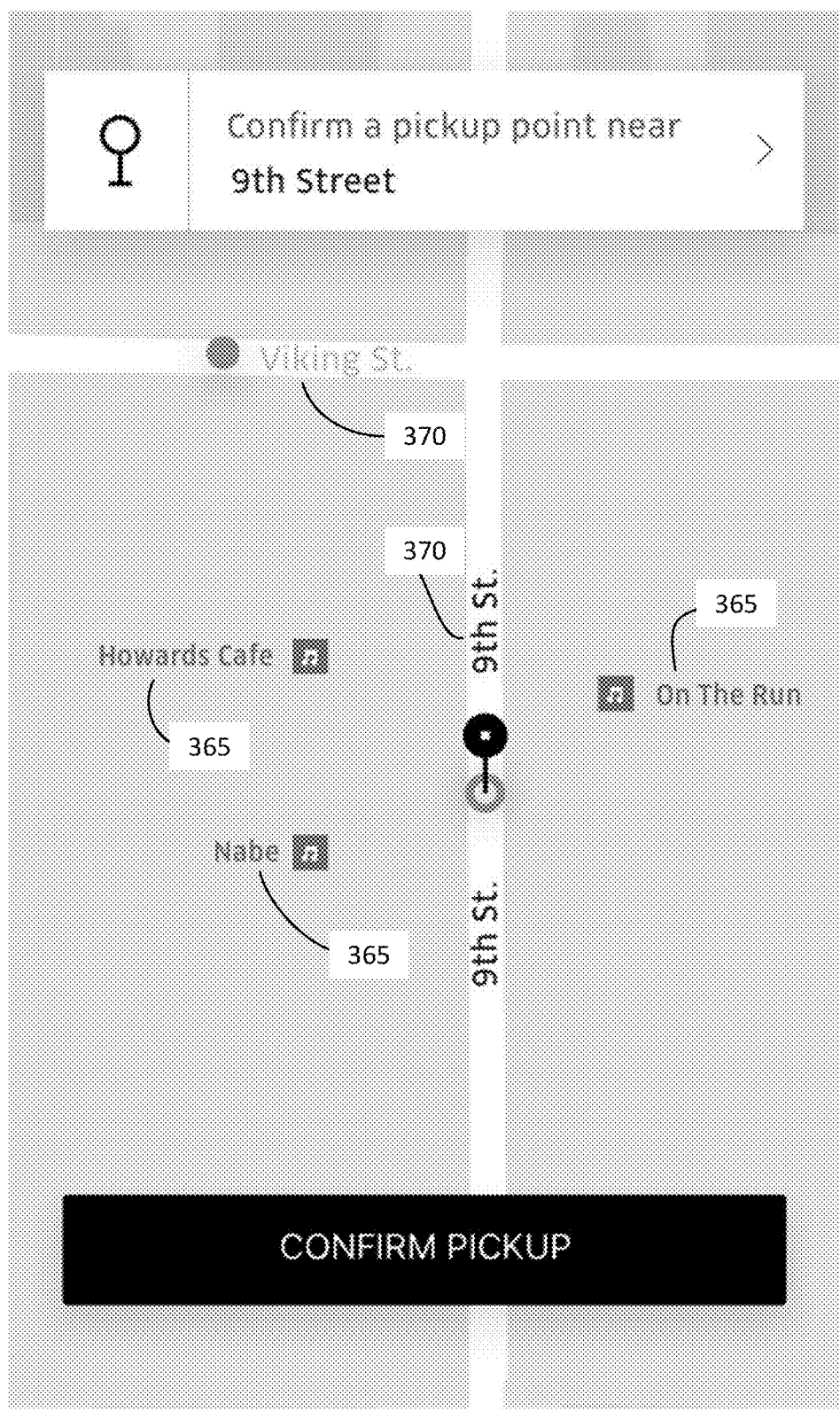

FIG. 3F illustrates another example interface in which building information describing the geographical footprint or layout of the building is not available. In this example, the map may be enhanced by highlighting nearby points of interest 365 and emphasizing the street name 370 within the interface.

Figure 3G:

FIG. 3G illustrates another example interface in which building information is available, while point of interest information is not. In this example, the map may be enhanced by highlighting multiple building footprints 375 and emphasizing the street names 370 within the interface.

Figure 3H:
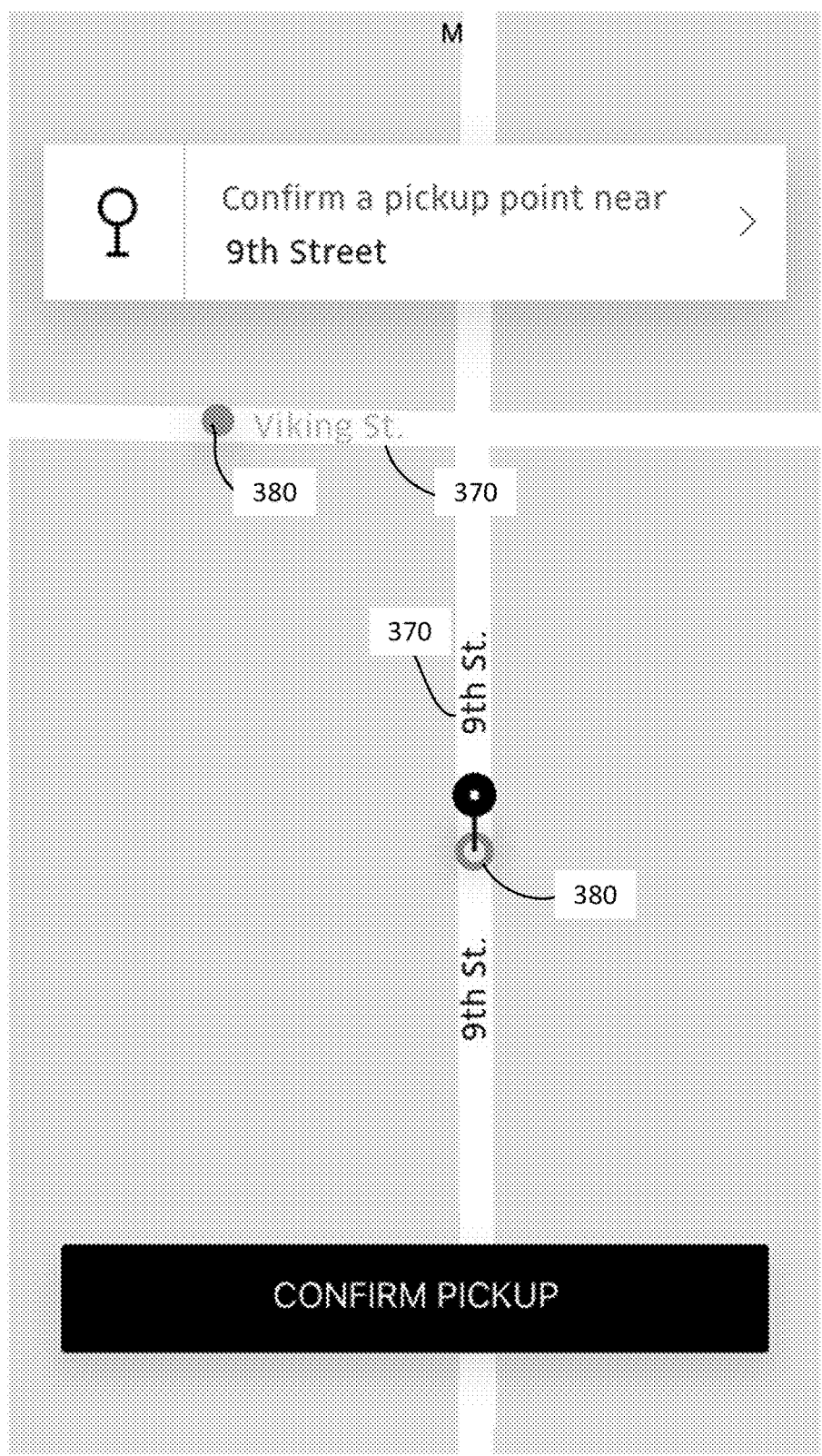
Figure 3I:
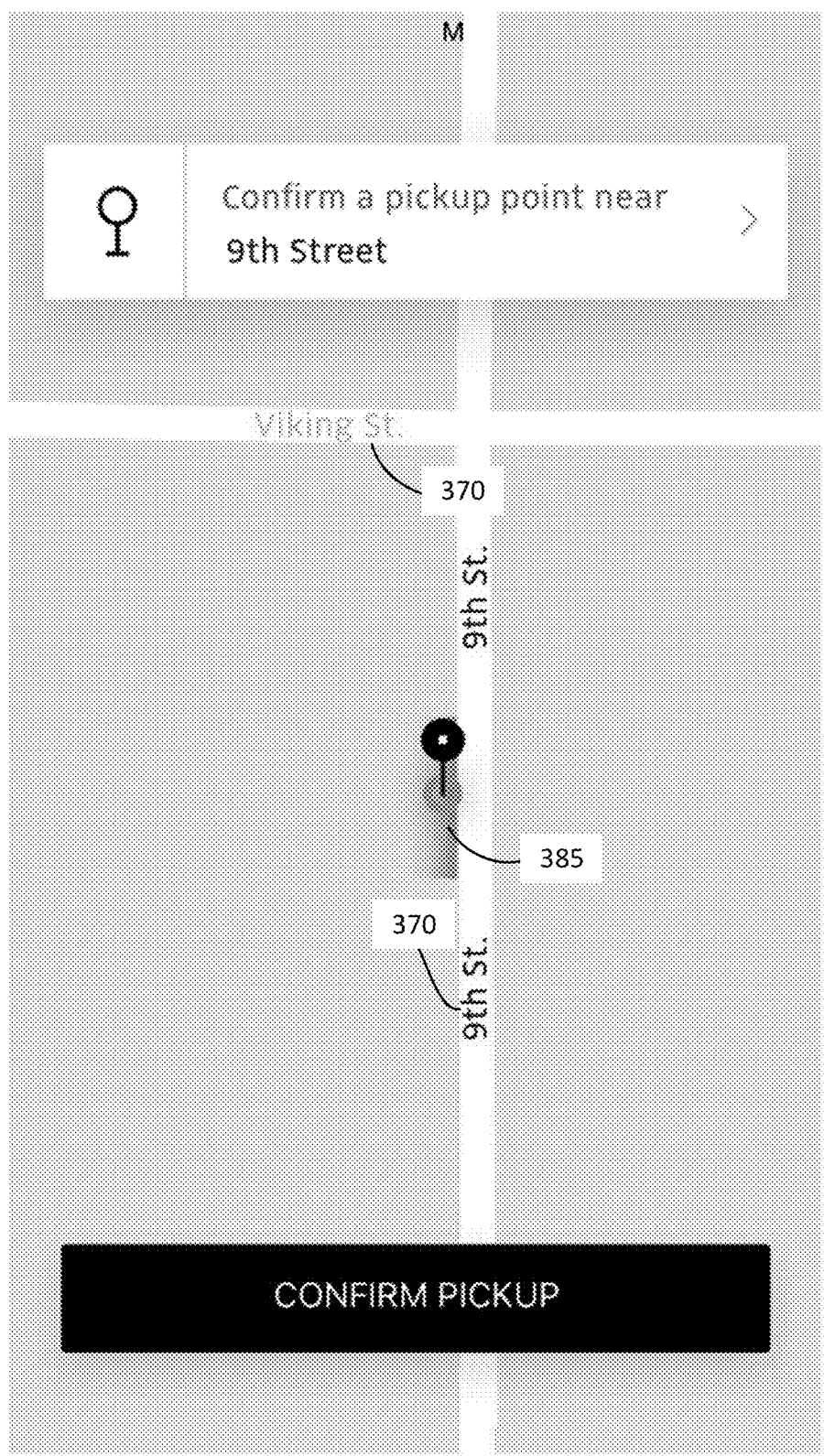

FIG. 3H illustrates an example interface in which no building or point of interest information is available. In that case, the user interface may designate one or more pickup locations or hotspots 380 along with emphasizing the street name 370. As shown in the example interface of FIG. 3I, this configuration may also include a highlight of the curb or street side 385 for the meeting location.

Figure 4:
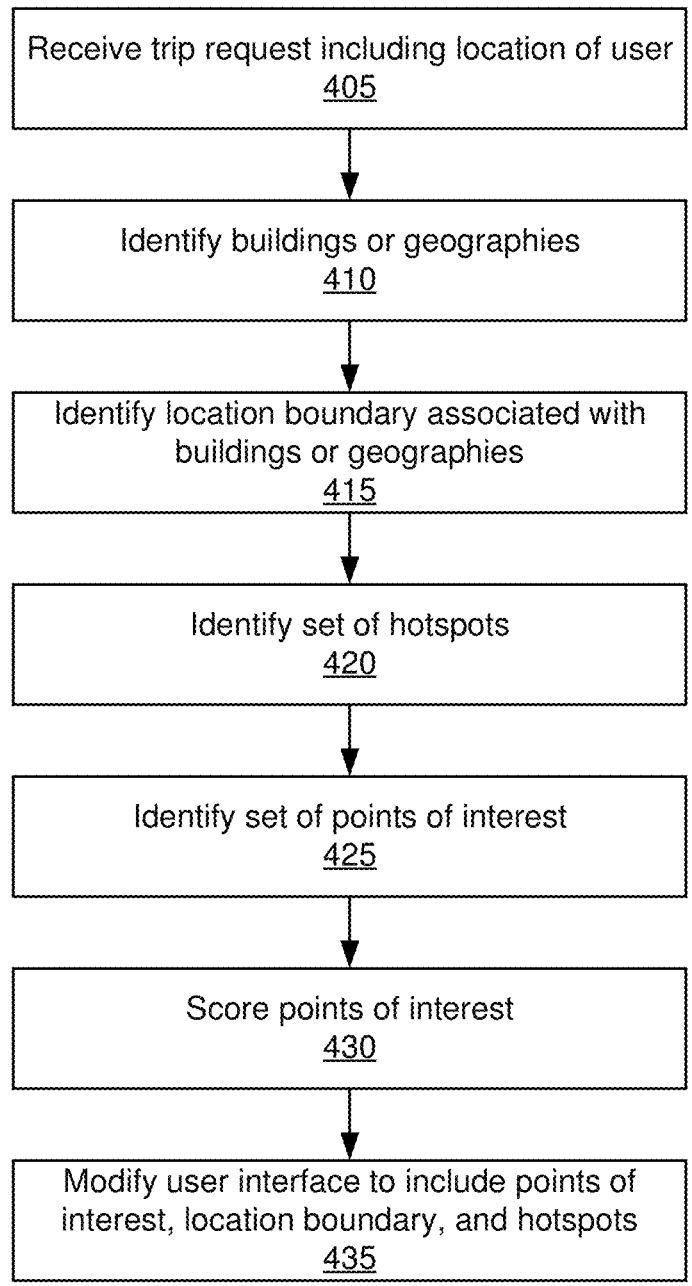
FIG. 4 is a flow chart illustrating a method of enhancing a map display for a user, in accordance with an embodiment.

FIG. 4 is a flow chart illustrating a method of enhancing a map display for a user, according to one embodiment. The steps of FIG. 4 may be performed by the online system 100. Some or all of the steps may be performed by other entities in other embodiments. In addition, other embodiments may include different and/or additional steps, and the steps may be performed in different orders.

The online system 100 receives 405 a trip request from a user of the online system, the trip request including a location of the user. Based on the received location, the online system 100 identifies 410 one or more buildings or geographies associated with the location. For example, the online system 100 determines whether the location of the user is inside of a building. The online system 100 additionally identifies 415 location boundaries associated with the one or more buildings or geographies. In the example where a user is inside of a building, the online system 100 determines the boundaries of the building and exits from the building to a street. The online system 100 identifies 420 a set of hotspots at or within a threshold distance of the location of the user. A hotspot is a cluster of locations in which trips commonly begin or end and represents an area likely to be convenient for pickup or drop off. For example, hotspots may be entrances to buildings, portions of sidewalks, or prominent or visible landmarks frequently used for pickup or drop off. The online system 100 identifies 425 a set of points of interest. Points of interest may be, for example, businesses, landmarks, building names, or other physical or visible reference points at the user's location. The online system 100 scores 430 the points of interest. The scoring represents a relative value of displaying each point of interest with respect to the point of interest's ability to assist in orienting or navigating a user's view of the area when shown on a map of the area. In one embodiment, the scoring additionally accounts for a relative visibility of the point of interest, a frequency of trips associated with the point of interest, and other factors. The online system 100 modifies 435 a user interface displaying a map of the area to include location boundaries, hotspots, and points of interest identified for the area.

Figure 5:
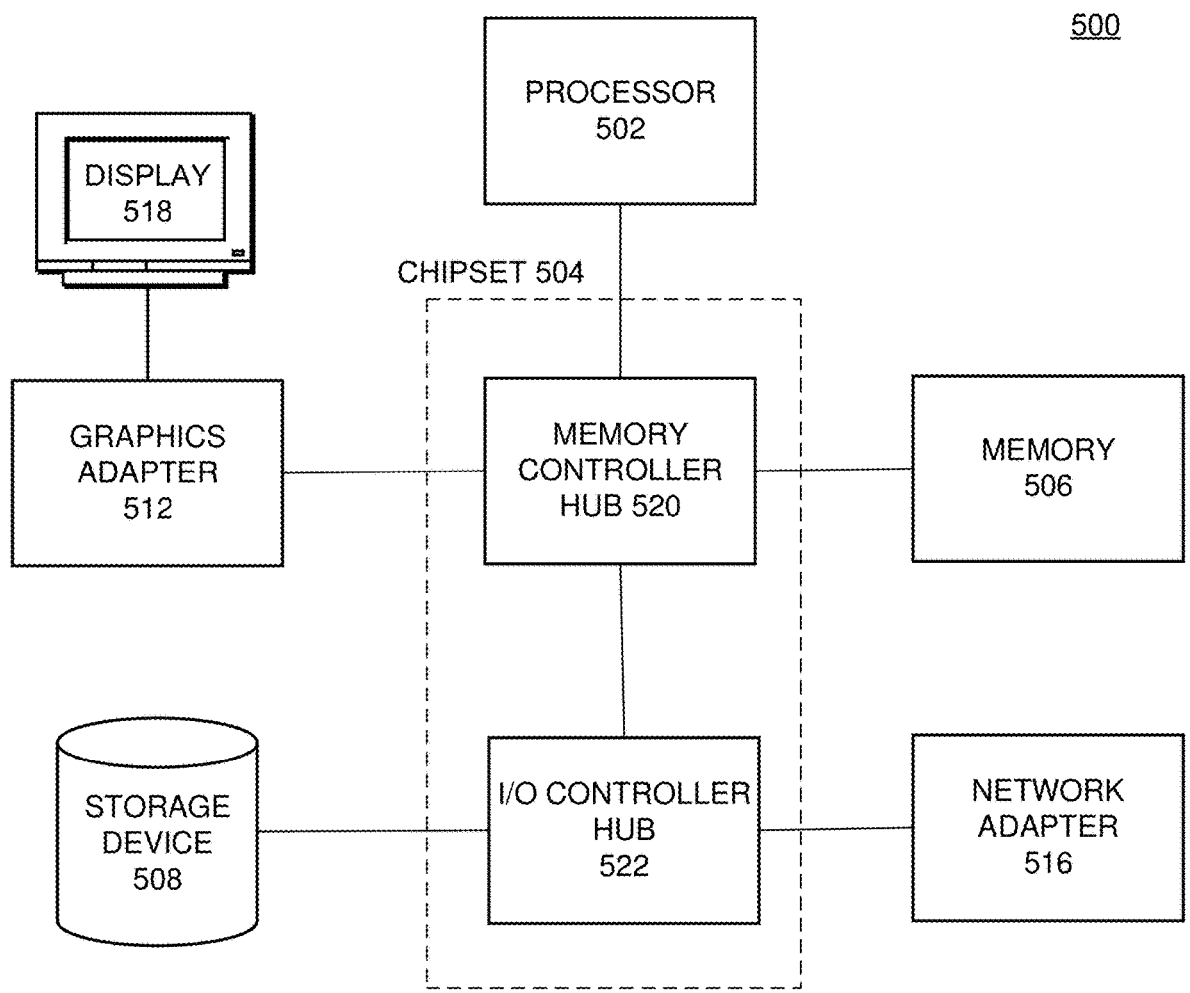
FIG. 5 is a high-level block diagram illustrating physical components of a computer used as part or all of one or more of the entities described herein, in accordance with an embodiment.

FIG. 5 is a high-level block diagram illustrating physical components of a computer 500 used as part or all of the online system 100 or client devices 120 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 such as a server or smartphone may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method comprising:
    receiving a trip request, the trip request including a current location of a user requesting a trip, a meeting location for the trip, and a request time;
    identifying a set of points of interest at or within a threshold distance of the current location;
    scoring each point of interest of the set of points of interest, a score representing a relative value of displaying each point of interest based on an ability of the point of interest to assist in orientation or navigation from the current location to the meeting location, the scoring comprising:
        determining an amount of trips that begin or end at a point of interest within a threshold amount of time of the request time, and
        scoring a point of interest associated with a greater amount of trips within the threshold amount of time higher relative to a point of interest associated with a fewer amount of trips; and
    modifying a user interface to display a map, the map showing an area including one or more points of interest based on the scoring.

2. The method of claim 1, wherein scoring each point of interest of the set of points of interest further comprises:
    augmenting a score for a point of interest associated with an amount of trips that begin or end at the point of interest at the request time to be higher.

3. The method of claim 1, further comprising:
receiving an input from the user to move the displayed map;
identifying a second set of points of interest based on a new area of the displayed map;
scoring each point of interest of the second set of points of interest; and
modifying the user interface to display the new area and one or more of the second set of points of interest based on the scoring.

4. The method of claim 1, wherein a score for each point of interest further represents a relative visibility of the point of interest.

5. The method of claim 1, wherein the set of points of interest includes one or more of: businesses, landmarks, and building names.

6. The method of claim 1, further comprising:
identifying, based on the current location, one or more buildings or geographies associated with the current location of the user;
identifying a location boundary associated with the one or more buildings or geographies; and
modifying the user interface to include the identified location boundary.

7. The method of claim 1, further comprising:
identifying, based on the current location, a set of hotspots at or within a threshold distance of the current location, each hotspot of the set of hotspots representing a convenient meeting location for beginning a trip; and
modifying the user interface to include one or more hotspots of the set of hotspots.

8. The method of claim 1, wherein modifying the user interface to display a map further comprises identifying a curb or a side of a street as the meeting location.

9. The method of claim 8, wherein the curb or the side of the street is determined based on a selection by the user requesting the trip.

10. The method of claim 8, wherein the curb or the side of the street is determined based on a hotspot associated with the current location.

11. A non-transitory computer-readable storage medium storing computer program instructions executable by a processor to perform operations comprising:
receiving a trip request, the trip request including a current location of a user requesting a trip, a meeting location for the trip, and a request time;
identifying a set of points of interest at or within a threshold distance of the current location;
scoring each point of interest of the set of points of interest, a score representing a relative value of displaying each point of interest based on an ability of the point of interest to assist in orientation or navigation from the current location to the meeting location, the scoring comprising:
determining an amount of trips that begin or end at a point of interest within a threshold amount of time of the request time, and
scoring a point of interest associated with a greater amount of trips within the threshold amount of time higher relative to a point of interest associated with a fewer amount of trips; and
modifying a user interface to display a map, the map showing an area including one or more points of interest based on the scoring.

12. The computer-readable storage medium of claim 11, wherein the instructions for scoring each point of interest of the set of points of interest further comprise instructions to perform operations comprising:
augmenting a score for a point of interest associated with an amount of trips that begin or end at the point of interest at the request time to be higher.

13. The computer-readable storage medium of claim 11, wherein the instructions further comprise instructions to perform operations comprising:
receiving an input from the user to move the displayed map;
identifying a second set of points of interest based on a new area of the displayed map;
scoring each point of interest of the second set of points of interest; and
modifying the user interface to display the new area and one or more of the second set of points of interest based on the scoring.

14. The computer-readable storage medium of claim 11, wherein a score for each point of interest further represents a relative visibility of the point of interest.

15. The computer-readable storage medium of claim 11, wherein the set of points of interest includes one or more of: businesses, landmarks, and building names.

16. The computer-readable storage medium of claim 11, wherein the instructions further comprise instructions to perform operations comprising:
identifying, based on the current location, one or more buildings or geographies associated with the location of the user;
identifying a location boundary associated with the one or more buildings or geographies; and
modifying the user interface to include the identified location boundary.

17. The computer-readable storage medium of claim 11, wherein the instructions further comprise instructions to perform operations comprising:
identifying, based on the current location, a set of hotspots at or within a threshold distance of the current location, each hotspot of the set of hotspots representing a convenient meeting location for beginning a trip; and
modifying the user interface to include one or more hotspots of the set of hotspots.

18. The computer-readable storage medium of claim 11, wherein the instructions for modifying the user interface to display the map further comprise instructions to perform operations comprising:
identifying a curb or a side of a street as a meeting location.

19. The computer-readable storage medium of claim 18, wherein the curb or the side of the street is determined based on a selection by the user requesting the trip.

20. The computer-readable storage medium of claim 18, wherein the curb or the side of the street is determined based on a hotspot associated with the current location.

* * * * *